US012739657B2

(12) United States Patent
Sumiya et al.

(10) Patent No.: US 12,739,657 B2
(45) Date of Patent: Sep. 15, 2026

(54) ESTIMATION DEVICE

(71) Applicant: NTT DOCOMO, INC., Tokyo (JP)

(72) Inventors: Masayasu Sumiya, Chiyoda-ku (JP); Fumiaki Igarashi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 262 days.

(21) Appl. No.: 18/706,617

(22) PCT Filed: Oct. 25, 2022

(86) PCT No.: PCT/JP2022/039756

§ 371 (c)(1),
(2) Date: May 1, 2024

(87) PCT Pub. No.: WO2023/095516

PCT Pub. Date: Jun. 1, 2023

(65) Prior Publication Data

US 2026/0164252 A1 Jun. 11, 2026

(30) Foreign Application Priority Data

Nov. 25, 2021 (JP) ................................ 2021-190856

(51) Int. Cl.
*H04W 16/18* (2009.01)
*H04W 4/029* (2018.01)
*H04W 4/90* (2018.01)

(52) U.S. Cl.
CPC .......... *H04W 16/18* (2013.01); *H04W 4/029* (2018.02); *H04W 4/90* (2018.02)

(58) Field of Classification Search
CPC ........ H04W 16/18; H04W 4/029; H04W 4/90
See application file for complete search history.

(56) References Cited

U.S. PATENT DOCUMENTS 11,410,509 B1 * 8/2022 Lecocke .................. G08B 7/06
2012/0029713 A1 * 2/2012 Spicer ...................... H02J 3/14
700/291

(Continued)

FOREIGN PATENT DOCUMENTS

JP 2021-124752 A 8/2021
JP 2021157635 A * 10/2021

OTHER PUBLICATIONS

International Search Report mailed on Jan. 17, 2023 in PCT/JP2022/039756 filed on Oct. 25, 2022 (2 pages).

(Continued)

*Primary Examiner* — Kenny S Lin
(74) *Attorney, Agent, or Firm* — Oblon, McClelland, Maier & Neustadt, L.L.P.

(57) ABSTRACT

An estimation apparatus includes a blackout estimator configured to estimate area blackout information indicating presence or absence of occurrence of a blackout in each area based on blackout information in a wireless communication base station, an area population estimator configured to estimate an area population based on in-service region information of a mobile wireless communication terminal in a service region, an evacuated population estimator configured to estimate an evacuated population of each evacuation center based on a correspondence between the evacuation center and each area, the area population, and the area blackout information, a power consumption estimator configured to estimate a number of pieces of used equipment of power-using equipment in the evacuation center based on the evacuated population for each type of equipment, and multiply the number of pieces of used equipment by power consumption in the power-using equipment, thereby estimating power consumption in the evacuation center.

11 Claims, 12 Drawing Sheets

(56) References Cited

U.S. PATENT DOCUMENTS

2019/0335040 A1* 10/2019 Penar .................... H04W 76/50
2025/0007454 A1* 1/2025 Igarashi .................. H02S 50/00
2025/0030376 A1* 1/2025 Igarashi .................. H02S 50/10

OTHER PUBLICATIONS

International Preliminary Report on Patentability and Written Opinion issued Jun. 6, 2024 in PCT/JP2022/039756 (submitting English translation only), 5 pages.

* cited by examiner

1
ST
WIRELESS COMMUNICATION BASE STATION GROUP
WIRELESS COMMUNICATION BASE STATION
sta
WIRELESS COMMUNICATION BASE STATION
stb
WIRELESS COMMUNICATION BASE STATION
stc
10
ESTIMATION APPARATUS
N
EXTERNAL INFORMATION SERVER
SV

*Fig.4*

| WIRELESS COMMUNICATION BASE STATION NAME | BLACKOUT STATE | EQUIPMENT FAILURE STATE | ... |
|---|---|---|---|
| BASE STATION sta | PRESENT | ABSENT | ... |
| BASE STATION stb | PRESENT | ABSENT | ... |
| BASE STATION stc | ABSENT | PRESENT | ... |
| ... | ... | ... | ... |

*Fig.8*

| EVACUATION CENTER NAME | CAPACITY | NUMBER OF HEATING APPLIANCES | DISASTER PREVENTION WIRELESS TERMINAL | ... |
|---|---|---|---|---|
| EVACUATION CENTER 1 | 100 | 4 | PRESENT | ... |
| EVACUATION CENTER 2 | 80 | 3 | PRESENT | ... |
| EVACUATION CENTER 3 | 50 | 3 | PRESENT | ... |
| ... | ... | ... | ... | ... |

*Fig.9*

| EVACUATION CENTER NAME | EVACUATED POPULATION | NUMBER OF HEATING APPLIANCES (ESTIMATED NUMBER OF PIECES OF USED EQUIPMENT) | DISASTER PREVENTION WIRELESS TERMINAL (ESTIMATED NUMBER OF PIECES OF USED EQUIPMENT) |
|---|---|---|---|
| EVACUATION CENTER 1 | 80 | 3 | PRESENT |
| EVACUATION CENTER 2 | 60 | 2 | PRESENT |
| EVACUATION CENTER 3 | 0 | 0 | ABSENT |
| ... | ... | ... | ... |

ESTIMATION DEVICE

TECHNICAL FIELD

The present invention relates to an estimation apparatus for estimating power consumption in an evacuation center.

BACKGROUND ART

In preparation for blackouts during disasters, it is recommended to equip evacuation centers where people evacuate, important infrastructure facilities, important facilities operated by the government, etc. with stationary storage batteries. Since a storage battery has a limited capacity, when a blackout is prolonged without power being supplied, power will run out, making it difficult to operate a facility, etc. Patent Literature 1 discloses technology for supplying power to a stationary storage battery.

CITATION LIST

Patent Literature

Patent Literature 1: Japanese Unexamined Patent Publication No. 2021-124752

SUMMARY OF INVENTION

Technical Problem

In the technology described in Patent Literature 1, when a large-scale blackout occurs during a disaster, a discharge command is issued to a power supply source such as an electric vehicle with the remaining capacity of the stationary storage battery reaching a predetermined value as a trigger, thereby realizing power supply to the storage battery. However, in the technology described in Patent Literature 1, a command is issued to the electric vehicle, etc. only when the remaining capacity of the storage battery reaches a specified threshold, and thus it is impossible to optimize a destination of the electric vehicle, etc. before the timing when power supply is required. In addition, when a tendency in power consumption during occurrence of a disaster is different from that during normal times, there is a possibility that a threshold with regard to the remaining capacity of the storage battery, which is set in advance as a trigger for a command to the electric vehicle, etc., is not an optimal value. In that case, it is difficult to supply power at appropriate timing.

Therefore, the invention has been made in view of the above problems, and an object of the invention is to enable timely power supply, etc. by estimating power consumption in an evacuation center equipped with a storage battery.

Solution to Problem

To solve the above problem, an estimation apparatus according to an aspect of the invention is an estimation apparatus for estimating power consumption in an evacuation center, the estimation apparatus including a blackout estimator configured to estimate area blackout information indicating presence or absence of occurrence of a blackout in each given geographically divided area based on blackout information indicating presence or absence of occurrence of a blackout in a wireless communication base station, an area population estimator configured to estimate an area population, which is a population of each area, based on in-service region information indicating a number of mobile wireless communication terminals in a service region in each area, an evacuated population estimator configured to estimate an evacuated population, which is a population evacuated to each evacuation center, based on a correspondence between the evacuation center and each area, the area population of each area, and the area blackout information, a power consumption estimator configured to estimate a number of pieces of used equipment, which is a number of pieces of power-using equipment using power in the evacuation center, based on the evacuated population for each type of power-using equipment, and multiply the number of pieces of used equipment by power consumption in the power-using equipment, thereby estimating power consumption in the evacuation center, and an output unit configured to output power consumption information indicating power consumption of each evacuation center.

According to the above aspect, the presence or absence of occurrence of a blackout in each area is recognized based on the blackout information in the wireless communication base station. Further, since the area population of the area where the blackout has occurred can be estimated based on the in-service region information in each area, the evacuated population of each evacuation center can be estimated based on the correspondence between the area and the evacuation center. Since the number of pieces of used equipment at the evacuation center depends on the evacuated population, a power consumption tendency at each evacuation center can be detected by estimating the number of pieces of used equipment of the power-using equipment based on the estimated evacuated population. Therefore, power can be supplied to the storage battery of the evacuation center in a timely manner.

Advantageous Effects of Invention

According to an aspect of the present disclosure, timely power supply, etc. becomes possible by estimating power consumption in an evacuation center equipped with a storage battery.

BRIEF DESCRIPTION OF DRAWINGS

FIG. 4 is a diagram illustrating an example of blackout information indicating the presence or absence of occurrence of a blackout in each wireless communication base station.

FIG. 8 is a diagram illustrating an example of evacuation center information including a capacity and the number of pieces of power-using equipment of each evacuation center.

FIG. 9 is a diagram illustrating an example of an evacuated population and the number of pieces of used equipment estimated in each evacuation center.

DESCRIPTION OF EMBODIMENTS

Figure 1:
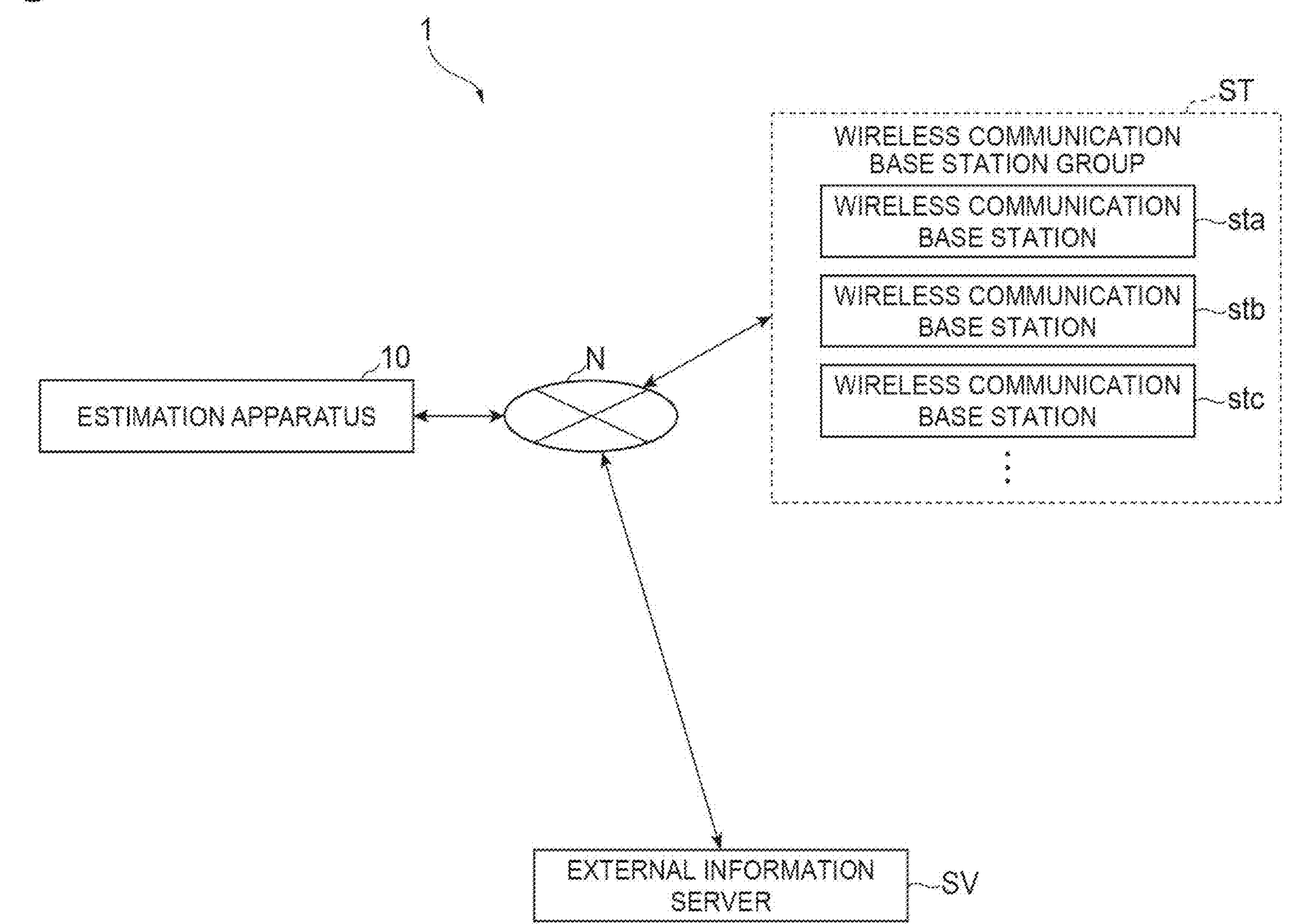
FIG. 1 is a diagram illustrating an example of an apparatus configuration of a system including an estimation apparatus of this embodiment.

An embodiment of an estimation apparatus according to the invention will be described with reference to the drawings. Note that, if possible, the same parts are given the same reference numerals and redundant descriptions will be omitted.

FIG. 1 is a diagram illustrating an example of an apparatus configuration of a system including an estimation apparatus. As illustrated in FIG. 1, a system 1 includes an estimation apparatus 10, a wireless communication base station group ST, and an external information server SV. The estimation apparatus 10 is configured to be able to transmit and receive information to and from the wireless communication base station group ST and the external information server SV via a network N. The estimation apparatus 10 is an apparatus that estimates power consumption in an evacuation center where people evacuate in the event of a disaster, etc.

The wireless communication base station group ST includes a plurality of wireless communication base stations sta, stb, stc, . . . . A wireless communication base station is an apparatus that relays and manages wireless communication of mobile wireless communication terminals. The wireless communication base station has an apparatus such as a rectifier that can monitor a power supply status. The rectifier, etc. monitors a power status related to power supplied to the wireless communication base station and an error occurrence status in various equipment included in the wireless communication base station, and can acquire blackout information indicating the presence or absence of occurrence of a blackout, equipment failure information indicating the presence or absence of equipment failure, etc.

Since the wireless communication base stations are installed at intervals of several hundred meters in a communication coverage area of mobile communication terminals, it is possible to recognize the presence or absence of occurrence of a blackout within the communication coverage area by referring to the blackout information, etc.

The external information server SV is an apparatus that acquires and accumulates disaster information such as the presence or absence of occurrence of a disaster, disaster occurrence area information indicating a geographical range in which the disaster has occurred, and disaster scale information indicating the scale of the disaster. The external information server SV transmits the disaster information to the estimation apparatus 10.

Figure 2:
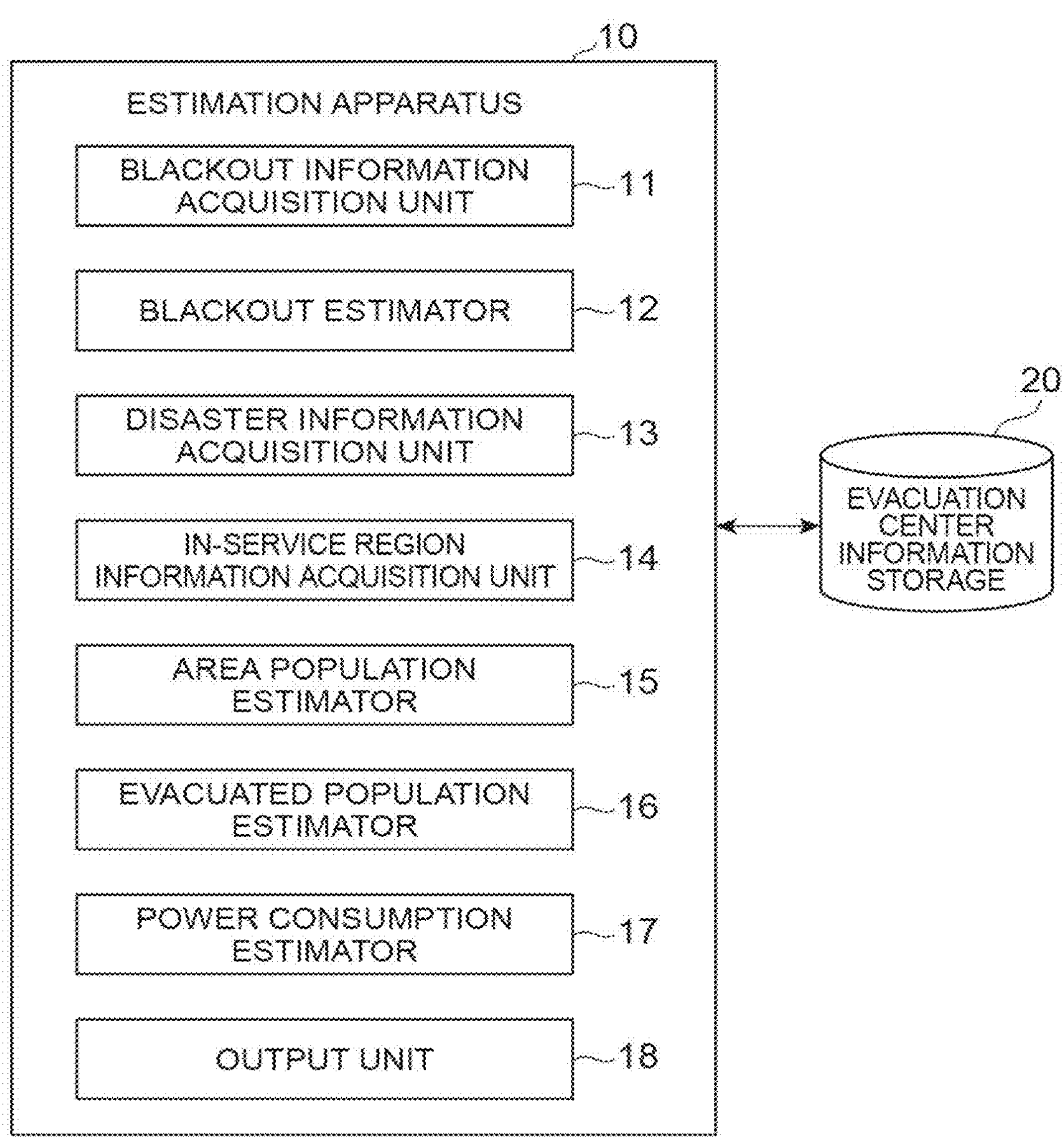
FIG. 2 is a block diagram illustrating a functional configuration of the estimation apparatus of this embodiment.

FIG. 2 is a block diagram illustrating a functional configuration of the estimation apparatus 10. As illustrated in FIG. 2, the estimation apparatus 10 includes a blackout information acquisition unit 11, a blackout estimator 12, a disaster information acquisition unit 13, an in-service region information acquisition unit 14, an area population estimator 15, an evacuated population estimator 16, a power consumption estimator 17, and an output unit 18. The estimation apparatus 10 is configured to be able to communicate with an evacuation center information storage 20. The evacuation center information storage 20 is a storage means that stores evacuation center information. The evacuation center information will be described later with reference to FIGS. 7 and 8.

Each of the functional units 11 to 18 included in the estimation apparatus 10 may be configured in one apparatus, or may be distributed and configured in a plurality of apparatuses. Further, the evacuation center information storage 20 may be configured to be included in the estimation apparatus 10, or may be configured in another apparatus configured to be able to communicate with the estimation apparatus 10.

Note that the block diagram illustrated in FIG. 2 illustrates blocks in functional units. These functional blocks (components) are realized by any combination of at least one of hardware and software. Furthermore, a method of realizing each functional block is not particularly limited. That is, each functional block may be realized using one physically or logically coupled apparatus, or may be realized by directly or indirectly (for example, by wire, wirelessly, etc.) connecting two or more physically or logically separated apparatuses and using a plurality of these apparatuses. The functional block may be realized by combining software with the one apparatus or the plurality of apparatuses.

Functions include determining, determining, judging, calculating, computing, processing, deriving, investigating, searching, verifying, receiving, transmitting, outputting, accessing, solving, selecting, choosing, establishing, comparing, assuming, expecting, considering, broadcasting, notifying, communicating, forwarding, configuring, reconfiguring, allocating, mapping, assigning, etc. However, the invention is not limited thereto. For example, a functional block (configuration unit) that performs transmission is referred to as a transmitting unit or a transmitter. In either case, as described above, the method of realizing is not particularly limited.

Figure 3:
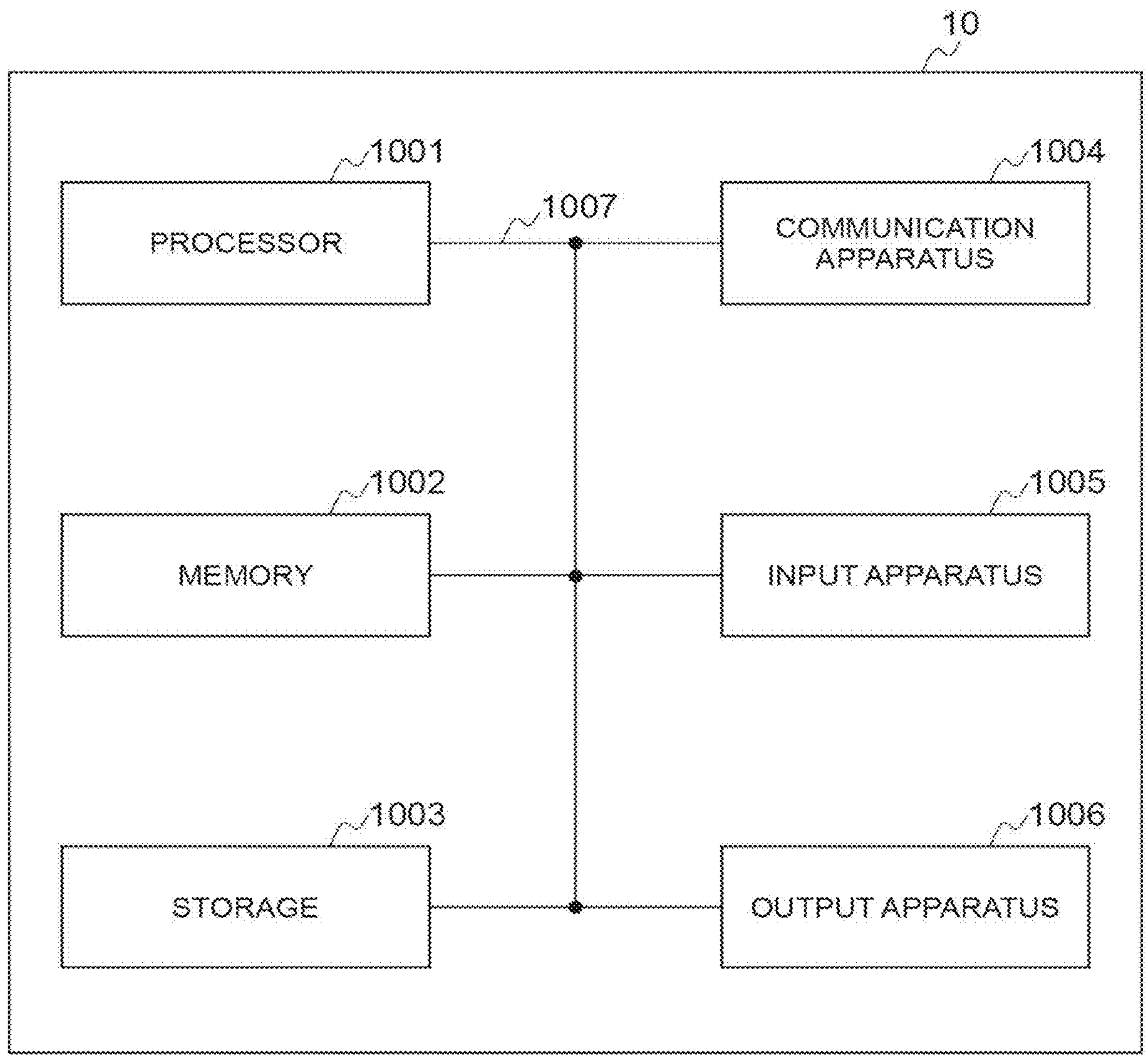
FIG. 3 is a hardware diagram of the estimation apparatus.

For example, the estimation apparatus 10 in an embodiment of the invention may function as a computer. FIG. 3 is a diagram illustrating an example of a hardware configuration of the estimation apparatus 10 according to this embodiment. The estimation apparatus 10 may be physically configured as a computer apparatus including a processor 1001, a memory 1002, a storage 1003, a communication apparatus 1004, an input apparatus 1005, an output apparatus 1006, a bus 1007, etc.

Note that, in the following description, the word “apparatus” can be interpreted as a circuit, a device, a unit, etc. The hardware configuration of the estimation apparatus 10 may be configured to include one or more of apparatuses, each of which is illustrated in FIG. 3, or may be configured not to include some of the apparatuses.

Each function of the estimation apparatus 10 is realized by loading predetermined software (program) onto hardware such as the processor 1001 and the memory 1002 so that the processor 1001 performs arithmetic operation and controlling communication by the communication apparatus 1004 and reading and/or writing of data in the memory 1002 and the storage 1003.

For example, the processor 1001 operates an operating system to control the entire computer. The processor 1001 may be configured as a central processing unit (CPU) including an interface with peripheral apparatuses, a control apparatus, an operation apparatus, a register, etc. For example, each of the functional units 11 to 18 illustrated in FIG. 2 may be realized by the processor 1001.

Furthermore, the processor 1001 reads a program (program code), a software module, and data from the storage

1003 and/or the communication apparatus 1004 to the memory 1002, and executes various processes in accordance therewith. A program that causes a computer to execute at least part of the operation described in the embodiment is used as the program. For example, each of the functional units 11 to 18 of the estimation apparatus 10 may be stored in the memory 1002 and realized by a control program operated by the processor 1001. Even though the above-described various processes have been described as being executed by one processor 1001, the processes may be executed by two or more processors 1001 simultaneously or sequentially. The processor 1001 may be implemented with one or more chips. Note that the program may be transmitted from a network via a telecommunications line.

The memory 1002 is a computer-readable recording medium, and may include, for example, at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage apparatus), etc. The memory 1002 can store an executable program (program code), a software module, etc. for implementing an estimation method according to an embodiment of the invention.

The storage 1003 is a computer-readable recording medium, and may include, for example, at least one of an optical disc such as a CD-ROM (Compact Disc ROM), a hard disk drive, a flexible disk, a magneto-optical disk (for example, a compact disk, a digital versatile disk, or a Blu-ray (registered trademark disk) disk), a smart card, a flash memory (for example, a card, a stick, or a key drive), a floppy (registered trademark disk) disk, a magnetic strip, etc. The storage 1003 may be referred to as an auxiliary storage apparatus. The above-mentioned storage medium may be, for example, a database including the memory 1002 and/or the storage 1003, a server, or another suitable medium.

The communication apparatus 1004 is hardware (transmission/reception device) for communication with a computer via a wired and/or wireless network, and is also referred to as, for example, a network device, a network controller, a network card, a communication module, etc.

The input apparatus 1005 is an input device (for example, a keyboard, a mouse, a microphone, a switch, a button, a sensor, etc.) that receives input from the outside. The output apparatus 1006 is an output device (for example, a display, a speaker, an LED lamp, etc.) that performs output to the outside. Note that the input apparatus 1005 and the output apparatus 1006 may have an integrated configuration (for example, a touch panel).

Furthermore, each apparatus such as the processor 1001 or the memory 1002 is connected by the bus 1007 for information communication. The bus 1007 may include a single bus or may include buses different between apparatuses.

In addition, the estimation apparatus 10 may include hardware such as a microprocessor, a digital signal processor (DSP), an application specific integrated circuit (ASIC), a programmable logic device (PLD), and a field programmable gate array (FPGA), and some or all of the respective functional blocks may be realized by the hardware. For example, the processor 1001 may be implemented with at least one of these pieces of hardware.

Referring again to FIG. 2, etc., the functional units of the estimation apparatus 10 will be described. The blackout information acquisition unit 11 acquires blackout information indicating the presence or absence of occurrence of a blackout in the wireless communication base station. FIG. 4 is a diagram illustrating an example of blackout information, etc. that can be acquired from the wireless communication base station group ST.

The blackout information acquisition unit 11 acquires blackout information, etc. from each wireless communication base station of the wireless communication base station group ST. In the example illustrated in FIG. 4, the blackout information acquisition unit 11 acquires blackout information, etc. of content in which a blackout state "present" and an equipment failure state "absent" from the wireless communication base station sta. Further, the blackout information acquisition unit 11 acquires blackout information, etc. of content in which a blackout state "present" and an equipment failure state "absent" from the wireless communication base station stb. Further, the blackout information acquisition unit 11 acquires blackout information, etc. of content in which a blackout state "absent" and an equipment failure state "present" from the wireless communication base station stc.

By acquiring the blackout information illustrated in FIG. 4, the estimation apparatus 10 can recognize that a blackout has occurred in each of the wireless communication base stations sta and stb. Further, when the blackout state is "present" and the equipment failure state is "absent", the estimation apparatus 10 may recognize that a blackout has occurred in the wireless communication base station.

The blackout estimator 12 estimates area blackout information indicating the presence or absence of occurrence of a blackout in each given geographically divided area based on blackout information indicating the presence or absence of occurrence of a blackout in a wireless communication base station. Specifically, the blackout estimator 12 acquires location information of the wireless communication base station where the blackout has occurred as blackout occurrence location information indicating a location where a blackout has occurred, and estimates the area blackout information by computing a blackout probability, which is a probability that a blackout has occurred in each area, based on a location relationship between a location indicated by the blackout occurrence location information and each area.

Figure 5:
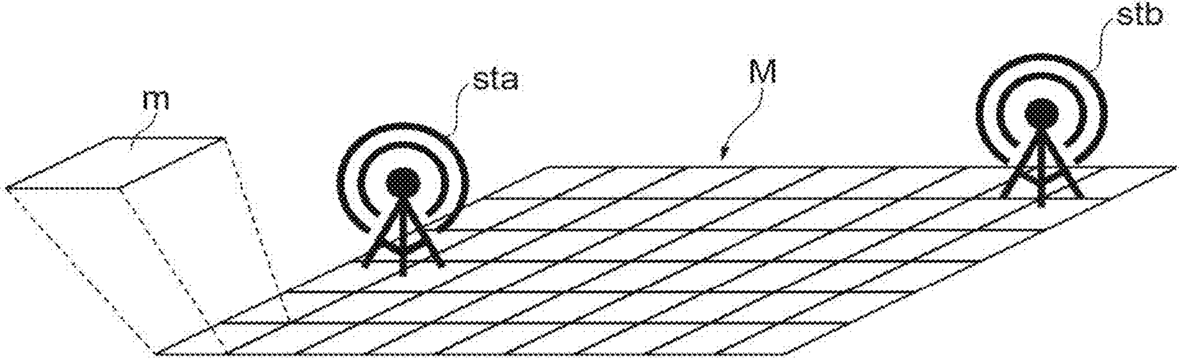
FIG. 5 is a diagram schematically illustrating a group of areas obtained by dividing a given geographical range and locations of wireless communication base stations.

FIG. 5 is a diagram schematically illustrating an area group M including a plurality of areas obtained by dividing a given geographical range in a mesh shape and locations of wireless communication base stations. As illustrated in FIG. 5, the area group M includes a plurality of areas m. The blackout estimator 12 acquires location information of the wireless communication base station sta and the wireless communication base station stb where blackouts have occurred as blackout occurrence location information. The blackout estimator 12 may acquire location information of a wireless communication base station from the wireless communication base station or from another apparatus that manages and stores information about the wireless communication base station.

The blackout estimator 12 may compute a blackout probability of the area m based on a distance between the area m and a location indicated by the blackout occurrence location information. Specifically, the blackout estimator 12 computes a higher blackout probability in the area m as the distance between the area m and the location indicated by the blackout occurrence location information decreases. In addition, the blackout estimator 12 may compute the blackout probability of the area m so that the blackout probability decreases in proportion to the distance from the location indicated by the blackout occurrence location information to the area m.

For example, the blackout estimator 12 may compute a blackout probability of each area $m_j$ (j is a number identifying each area) using the following equation.

$$\text{Area}'_j\text{s blackout probability} = e^{\alpha \times Distance(Base_i, Area_j)} \quad \text{[Equation 1]}$$

A left side of the above equation represents the blackout probability of the area $m_j$. α on a right side of the above equation is a weight for blackout estimation, and is set to any value. Further, Distance ($Base_i$, $Area_j$) is expressed by the following equation.

$$\text{Distance}(\text{Base}_1, \text{Area}_j) = \min(a) \quad \text{[Equation 2]}$$

$$a \in AA = \{\text{Distance}(\text{Base}_1, \text{Area}_j), \ldots , \text{Distance}(\text{Base}_N, \text{Area}_j)\}$$

That is, Distance ($Base_i$, $Area_j$) is a minimum distance among distances between the respective wireless communication base stations 1 to N, in each of which a blackout has occurred, and the area $m_j$.

In this way, considering that there is a high possibility that a blackout has occurred in an area around a location of a wireless communication base station where a blackout has occurred, it is possible to compute a blackout probability in each area based on a location relationship between each area and a location indicated by the blackout occurrence location information. Therefore, by using the blackout probability as the area blackout information, it is possible to obtain area blackout information suitable for computing the evacuated population.

Figure 6:
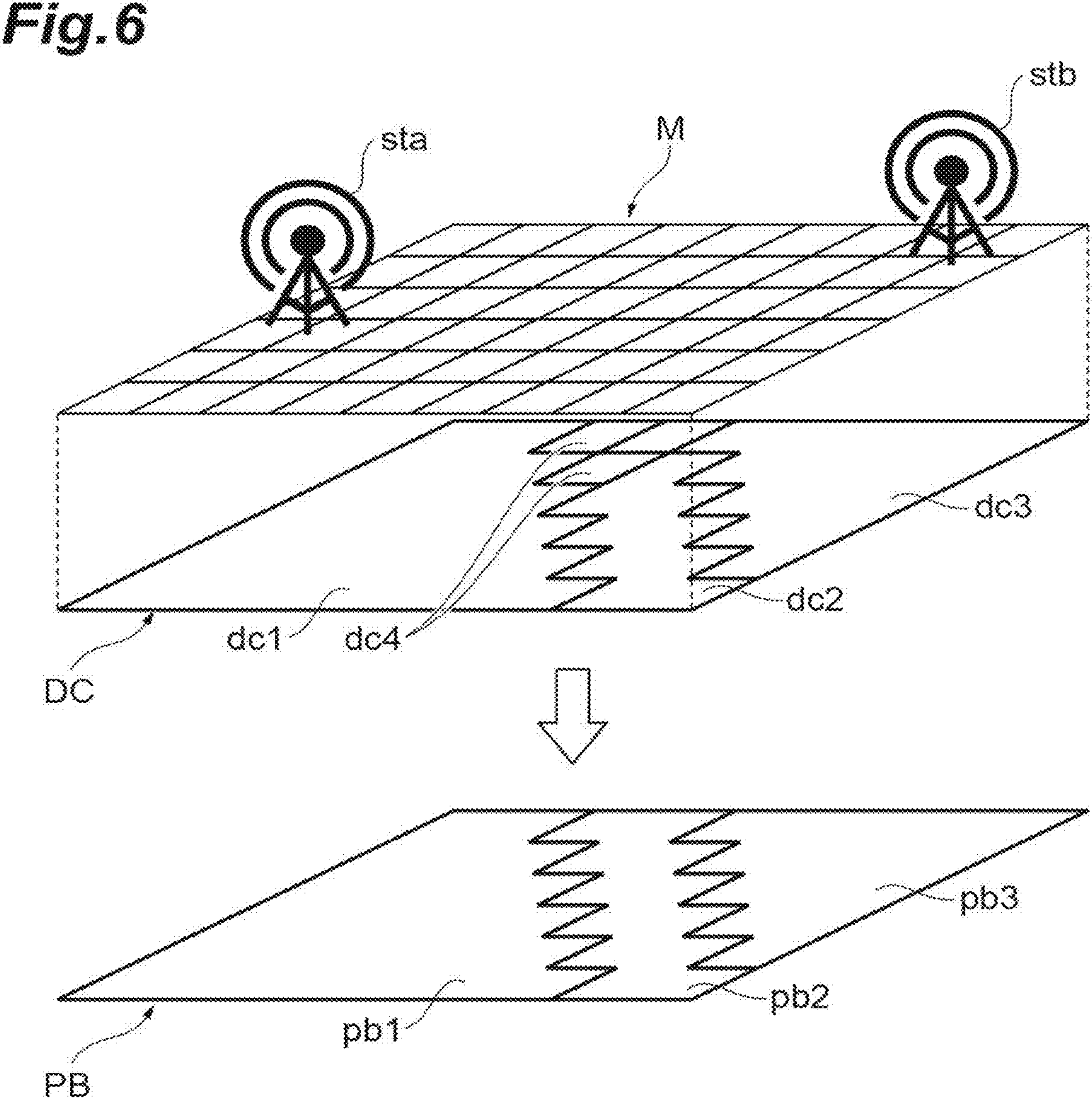
FIG. 6 is a diagram schematically illustrating an example of a blackout probability estimated based on a correspondence between a location of a wireless communication base station and a wiring class associated with each area.

FIG. 6 is a diagram illustrating another example of computing the blackout probability of the area m. In the example illustrated in FIG. 6, the blackout estimator 12 computes the blackout probability of each area based on a wiring class. The wiring class is information indicating a power supply route system, and is associated with each wireless communication base station and each area as attribute information.

As illustrated in FIG. 6, wiring class information DC includes information associating each area with one of wiring classes dc1, dc2, dc3, and dc4. Areas m having the same wiring class indicate that the areas m are supplied with power via substations, electric wires, etc. of the same system. When a blackout occurs in a certain area, there is a high possibility that a blackout also occurs in another area having the same wiring class.

In addition, as illustrated in FIG. 6, the wireless communication base station sta is associated with the wiring class dc1, and the wireless communication base station stb is associated with the wiring class dc3. The blackout estimator 12 sets a blackout probability in an area having the same wiring class as that of a wireless communication base station indicated by blackout information that a blackout has occurred to 100%, and sets a blackout probability in an area having the same wiring class as that of the wireless communication base station indicated that a blackout has not occurred to 0%.

Specifically, the blackout estimator 12 estimates blackout area information PB based on blackout information and a wiring class. Since the wireless communication base station sta where a blackout has occurred is associated with the wiring class dc1, the blackout estimator 12 sets a blackout probability of an area region pb1 including an area associated with the wiring class dc1 to 100%.

Similarly, since the wireless communication base station stb where a blackout has occurred is associated with the wiring class dc3, the blackout estimator 12 sets a blackout probability of an area region pb3 including an area associated with the wiring class dc3 to 100%.

In addition, the blackout estimator 12 sets a blackout probability of an area region pb2 including an area associated with the same wiring class as that of a wireless communication base station indicated that a blackout has not occurred or an area having a wiring class different from that of a wireless communication base station in which a blackout has occurred to 0%.

In this way, area blackout information can be easily obtained by estimating a blackout probability of each area based on whether or not each area has the same wiring class as that of a wireless communication base station where a blackout has occurred.

Referring again to FIG. 2, the estimation apparatus 10 may include a disaster information acquisition unit 13. The disaster information acquisition unit 13 acquires disaster information including at least information on a disaster occurrence area indicating a geographical range where a disaster has occurred from a given information source. The disaster information may include disaster scale information indicating a scale of the disaster. When the disaster information is acquired by the disaster information acquisition unit 13, the blackout estimator 12 limits at least one of a wireless communication base station and an area corresponding to blackout information used for estimation of the area blackout information based on the disaster occurrence area indicated by the disaster information. That is, the blackout estimator 12 may estimate area blackout information only for the area m included in the disaster occurrence area. Furthermore, the blackout estimator 12 may use only information related to a wireless communication base station included in the disaster occurrence area to estimate area blackout information.

In this way, since at least one of a wireless communication base station and an area targeted for estimation of the area blackout information is limited based on information on the disaster occurrence area indicated by the disaster information, a processing load related to computing the area blackout information can be reduced.

Note that the blackout estimator 12 may re-estimate the area blackout information when a change occurs in the blackout information. Then, in response to re-estimation of the area blackout information triggered by the change in the blackout information, the evacuated population may be re-estimated by the evacuated population estimator 16 based on the re-estimated area blackout information, the number of pieces of used equipment and the power consumption may be re-estimated by the power consumption estimator 17 based on the re-estimated evacuated population, and power consumption information indicating the re-estimated power consumption may be output by the output unit 18, which will be described later. In this way, by executing a series of processes for generating power consumption information in response to the change in the blackout information, it becomes possible to obtain latest power consumption information.

The in-service region information acquisition unit 14 acquires in-service region information of a mobile wireless communication terminal in each area from a wireless communication base station that relays and manages wireless communication of the mobile wireless communication terminal and a given management apparatus, etc. that manages the in-service region information.

The area population estimator 15 estimates an area population, which is a population of each area, based on in-service region information indicating the number of mobile radio communication terminals in a service region in each area. For example, the area population estimator 15 may estimate the number of mobile wireless communication terminals in each area indicated by the in-service region information as the population of the area, or may estimate the number obtained by multiplying a given coefficient by the number of mobile wireless communication terminals in each area indicated by the in-service region information as the population of the area.

The evacuated population estimator 16 estimates the evacuated population, which is the population evacuated to each evacuation center, based on a correspondence between the evacuation center and each area, the area population of each area, and the area blackout information.

Specifically, the evacuated population estimator 16 multiplies the blackout probability in each area by the area population to compute an area evacuated population indicating a population considered to be evacuated to the evacuation center in each area. Then, the evacuated population estimator 16 estimates the evacuated population of each evacuation center by totaling area evacuated populations of areas each having a correspondence with each evacuation center.

Figure 7:
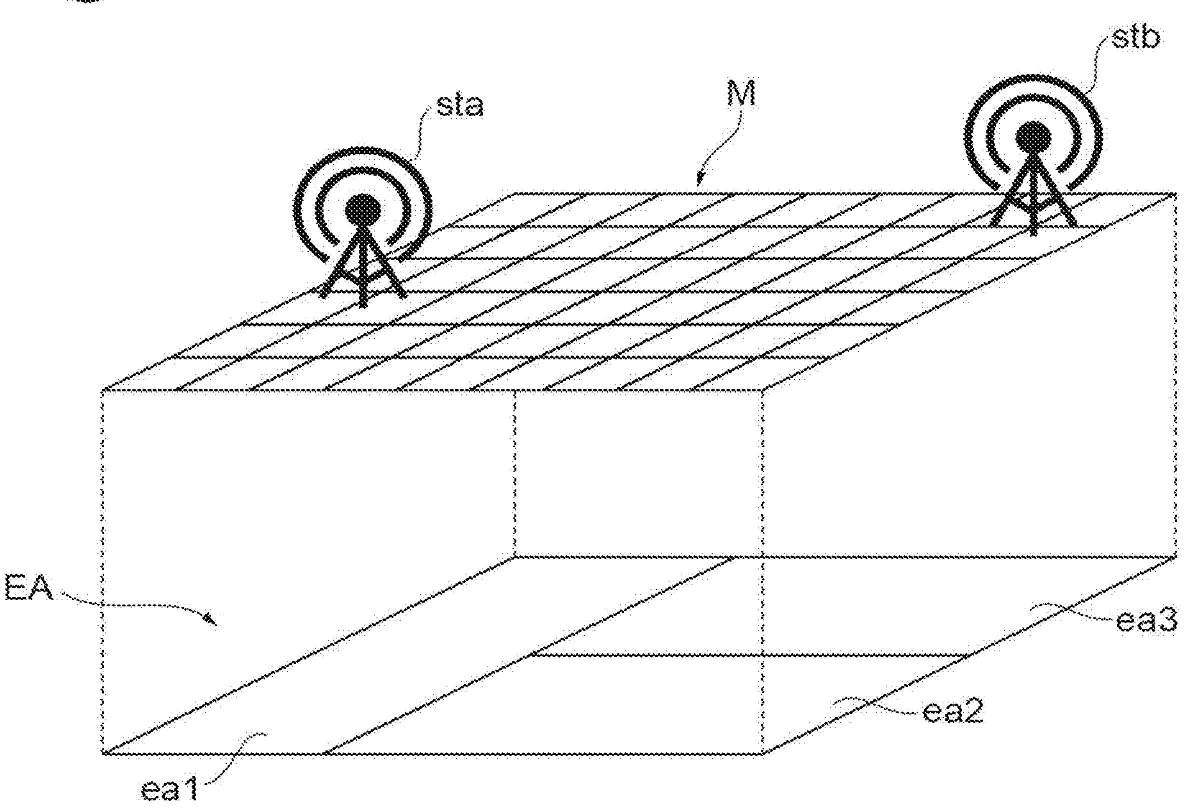
FIG. 7 is a diagram schematically illustrating a correspondence between an area group and a geographical range where people evacuate to each evacuation center.

FIG. 7 is a diagram schematically illustrating a correspondence between the area group M and a geographical range where people evacuate to each evacuation center. The evacuated population estimator 16 acquires evacuation range information EA indicating the geographic range where people evacuate to each evacuation center from, for example, the evacuation center information storage 20. The evacuation range information EA may be included in a part of the evacuation center information.

In an example illustrated in FIG. 7, when it is assumed that three evacuation centers 1, 2, and 3 are provided in a geographical range corresponding to the area group M, the evacuation range information EA includes information on evacuation target areas ea1, ea2, and ea3 corresponding to the evacuation centers 1, 2, and 3, respectively. Then, the evacuated population estimator 16 acquires information identifying the area m belonging to each of the evacuation target areas ea1, ea2, and ea3 as information on the area m where evacuation to each evacuation center is performed.

The evacuated population estimator 16 estimates an evacuated population of an evacuation center k using the following equation.

[Equation 3]

$$\text{Area}'_k\text{s Estimated evacuated population} = \sum_{j=1}^{M} \text{Area}'_j\text{s blackout probability} \times B_j \times \text{Area}'_j\text{s recent demographic data} \times \beta$$

A left side of the above equation represents the evacuated population of the evacuation center k. M on a right side of the above equation is the total number of areas. $\text{Area}_j$'s blackout probability is a blackout probability of an area $m_j$. $B_j$ denotes a correspondence between the evacuation center k and the area $m_j$, and is expressed, for example, as follows.

[Equation 4]

$$B = \{0, 0, 0, \ldots, 1, \ldots, 1, 0, 0\}$$

$B_j$=0 (when the area $m_j$ is not an area where evacuation to the evacuation center k is performed)

$B_j$=1 (when the area $m_j$ is an area where evacuation to the evacuation center k is performed)

B in the above equation is an M-dimensional vector whose elements are $B_1$ to $B_M$, and each element indicates whether or not the area $m_j$ is an area where evacuation to the evacuation center k is performed. As described with reference to FIG. 7, B indicating the correspondence between the evacuation center k and the area $m_j$ is set in advance based on information on the area m where evacuation to each evacuation center is performed.

$\text{Area}_j$'s recent demographic data in the above equation is an area population of the area $m_j$.

Furthermore, as illustrated in the above equation, the evacuated population estimator 16 may compute an area evacuated population by multiplying the product of the blackout probability in each area and the area population by a weighting coefficient β, and the weighting coefficient β is a weight for estimating the evacuated population, may be a coefficient for correcting a difference between the estimated evacuated population and an actual evacuated population, and is set to any value in advance.

Further, the weighting coefficient β may be generated by inputting, to a weighting coefficient generation model, an area feature quantity including at least the number of people in the service region indicating the number of mobile wireless communication terminals in the service region in each area. The weighting coefficient generation model is a model that takes, as input, an area feature quantity including at least the number of people in the service region indicating the number of mobile wireless communication terminals in the service region in each area and outputs a weighting coefficient, and is constructed by machine learning. The weighting coefficient generation model can be constructed by machine learning using training data including a theoretical weighting coefficient computed based on an actual value at the time of occurrence of a past disaster and an area feature quantity including at least the number of people in the service region.

The theoretical weighting coefficient may be computed by dividing an actual area evacuated population, which is a population actually evacuated in each area at the time of occurrence of a past disaster, by the product of the blackout probability and the area population. The area feature quantity is not limited to the number of people in the service region indicating the number of mobile wireless communication terminals in the service region, and may include, for example, an average population during normal times, the number of people in the service region by time zone, the presence or absence of an important facility or an important base in the area, geographic information such as an altitude, etc. A machine learning method may be, for example, a decision tree analysis method such as LightGBM, but is not limited to this method, and may be any other well-known analysis method.

In this way, the area evacuated population can be computed by multiplying the product of the blackout probability and the area population by the weighting coefficient generated by the weighting coefficient generation model that reflects results of the area feature quantity, the area evacuated population, etc. Therefore, a highly accurate area evacuated population can be obtained.

The power consumption estimator 17 estimates the number of pieces of used equipment, which is the number of pieces of power-using equipment using power in the evacuation center, based on the evacuated population for each type of power-using equipment.

Specifically, the power consumption estimator 17 computes the number of pieces of used equipment by multiplying the number of pieces of power-using equipment provided in the evacuation center by a ratio of the evacuated population to the capacity of each evacuation center. The power consumption estimator 17 acquires evacuation center information from the evacuation center information storage 20 to compute the number of pieces of used equipment. FIG. 8 is a diagram illustrating an example of the evacuation center information stored in the evacuation center information storage 20. The evacuation center information includes information indicating the capacity, the number of heating appliances, and the presence or absence of a disaster prevention wireless terminal of each evacuation center. The heating appliance and the disaster prevention wireless terminal are included in an example of the power-using equipment. For example, in an evacuation center 1, the capacity is “100”, the number of heating appliances is “4”, and the presence or absence of the disaster prevention wireless terminal is “present”.

FIG. 9 is a diagram illustrating an example of the evacuated population and the number of pieces of used equipment estimated in each evacuation center. Since the evacuated population of the evacuation center 1 is 80 people, the power consumption estimator 17 obtains the product “3.2” by multiplying the number of heating appliances “4” of the evacuation center 1 by a ratio (80/100) of the evacuated population “80” to the capacity “100” in the evacuation center 1, and, for example, rounds off a fraction thereof, thereby obtaining the estimated number of pieces of used equipment “3”.

In addition, since a disaster prevention wireless terminal is power-using equipment used when the evacuated population is one or more people, the power consumption estimator 17 obtains the estimated number of pieces of used equipment “present (1)” of the disaster prevention wireless terminal in the evacuation center 1.

Similarly, with regard to an evacuation center 2, the power consumption estimator 17 obtains the product “2.25” by multiplying the number of heating appliances “3” by a ratio (60/80) of the evacuated population “60” to the capacity “80”, and, for example, rounds off a fraction thereof, thereby obtaining the estimated number of pieces of used equipment “2”. In addition, since the evacuated population of the evacuation center 2 is one or more people, the power consumption estimator 17 obtains the estimated number of pieces of used equipment “present (1)” of the disaster prevention wireless terminal in the evacuation center 2.

In addition, with regard to an evacuation center 3, the power consumption estimator 17 obtains the estimated number of pieces of used equipment “0” by multiplying the number of heating appliances “3” by a ratio (0/50) of the evacuated population “0” to the capacity “50”. In addition, since the evacuated population of the evacuation center 3 is one or more people, the power consumption estimator 17 obtains the estimated number of pieces of used equipment “absent (0)” of the disaster prevention wireless terminal in the evacuation center 3.

Note that, when a temperature at an evacuation center is greater than or equal to a preset threshold for a predetermined type of power-using equipment, the power consumption estimator 17 may set an estimated value of the number of pieces of used equipment of the predetermined type of power-using equipment to zero. Since a heating appliance is not used when the temperature is high, when the threshold related to the temperature is set to, for example, 20 degrees, and when the temperature at the evacuation center is 20 degrees or more, the power consumption estimator 17 sets the number of pieces of used equipment of the heating appliance to zero regardless of the evacuated population.

The power consumption estimator 17 estimates power consumption in the evacuation center by multiplying the number of pieces of used equipment by power consumption in power-using equipment. Specifically, to estimate power consumption by the heating appliances in the evacuation center 1, the power consumption estimator 17 multiplies the power consumption of the heating appliances by the estimated number of pieces of used equipment “3” of the heating appliances, thereby computing the power consumption by the heating appliances in the evacuation center 1.

In addition, the power consumption estimator 17 computes power consumption by the disaster prevention wireless terminal in the evacuation center 1 by multiplying the power consumption of the disaster prevention wireless terminal by the estimated number of pieces of used equipment “1” of the disaster prevention wireless terminal. Then, the power consumption estimator 17 computes the power consumption in the evacuation center 1 by totaling power consumption of all pieces of power-using equipment in the evacuation center 1.

Referring again to FIG. 2, the output unit 18 outputs power consumption information indicating power consumption of each evacuation center. An output mode of the power consumption information is not limited, and the output unit 18 may cause a predetermined display apparatus to display power consumption information indicating the power consumption of each evacuation center estimated by the power consumption estimator 17, cause a predetermined storage means to store the power consumption information, or transmit the power consumption information to a predetermined apparatus.

In addition, when information on remaining power of a storage battery provided in each evacuation center can be acquired, the output unit 18 may output remaining power information indicating the remaining power of the storage battery of each evacuation center based on the remaining power of the storage battery of each evacuation center and power consumption in each evacuation center estimated by the power consumption estimator 17.

Figure 10:
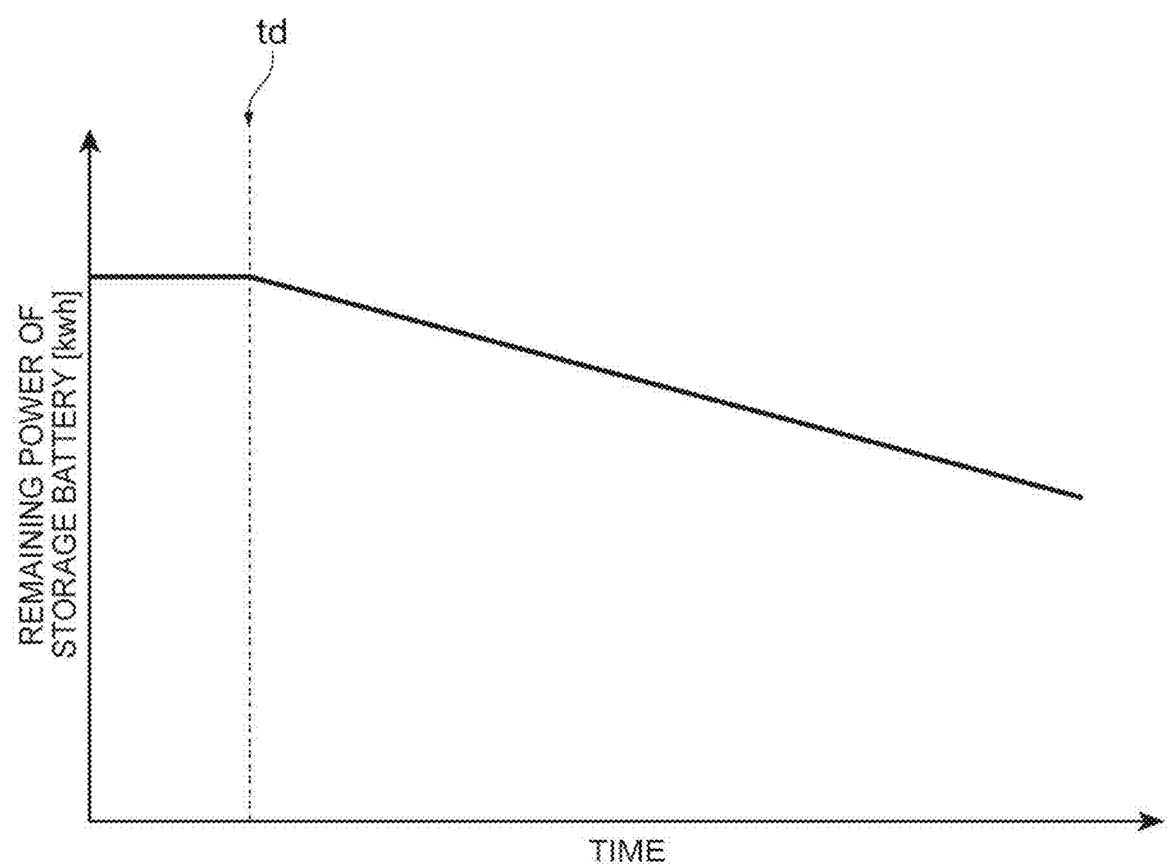
FIG. 10 is a diagram illustrating an example of power consumption information.

FIG. 10 is an example of the power consumption information, and is a diagram illustrating changes in the remaining power with respect to a time in a storage battery of a certain evacuation center. As illustrated in FIG. 10, the output unit 18 may output a graph indicating changes in the remaining power in the storage battery of the evacuation center. The example illustrated in FIG. 10 illustrates that the remaining power linearly decreases as time passes after a disaster occurrence time td. In this way, with reference to the power consumption information, power can be supplied to the storage battery in a timely manner by recognizing a decreasing trend in the remaining power of the storage battery at the evacuation center.

Figure 11:
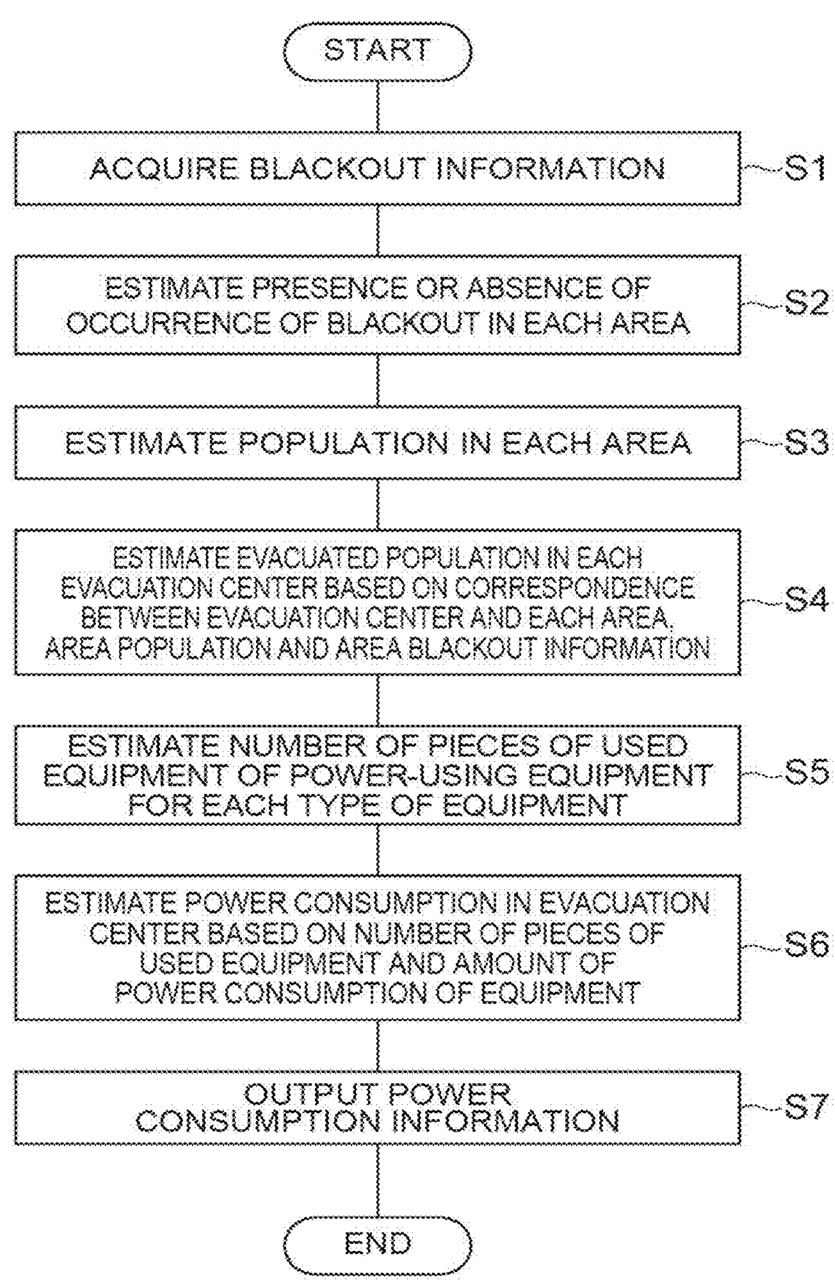
FIG. 11 is a flowchart illustrating processing content of an estimation method in the estimation apparatus.

Next, a description will be given of processing content of an estimation method in the estimation apparatus 10 with reference to FIG. 11.

In step S1, the blackout information acquisition unit 11 acquires blackout information indicating presence or absence of occurrence of a blackout in the wireless communication base station.

In step S2, the blackout estimator 12 estimates area blackout information indicating presence or absence of occurrence of a blackout in each area m based on the blackout information.

In step S3, the in-service region information acquisition unit 14 acquires in-service region information of the mobile wireless communication terminal in each area from the wireless communication base station that relays and manages wireless communication of the mobile wireless communication terminal, the given management apparatus that manages the in-service region information, etc. Then, the area population estimator 15 estimates the area population, which is the population of each area, based on the in-service region information indicating the number of mobile wireless communication terminals in the service region in each area. Note that either processing of step S2 or processing of step S3 may be performed first.

In step S4, the evacuated population estimator 16 estimates the evacuated population, which is the population evacuated to each evacuation center, based on the correspondence between the evacuation center and each area, the area population of each area, and the area blackout information.

In step S5, the power consumption estimator 17 estimates the number of pieces of used equipment, which is the number of pieces of power-using equipment using power in the evacuation center, based on the evacuated population for each type of power-using equipment.

In step S6, the power consumption estimator 17 estimates the power consumption in the evacuation center based on the number of pieces of used equipment for each piece of power-using equipment and the power consumption in each piece of power-using equipment. Specifically, the power consumption estimator 17 estimates the power consumption in the evacuation center by multiplying the number of pieces of used equipment by the power consumption in the power-using equipment.

In step S7, the output unit 18 outputs the power consumption information indicating the power consumption of each evacuation center.

Next, a description will be given of an estimation program for causing a computer to function as the estimation apparatus 10 of this embodiment with reference to FIG. 12.

Figure 12:
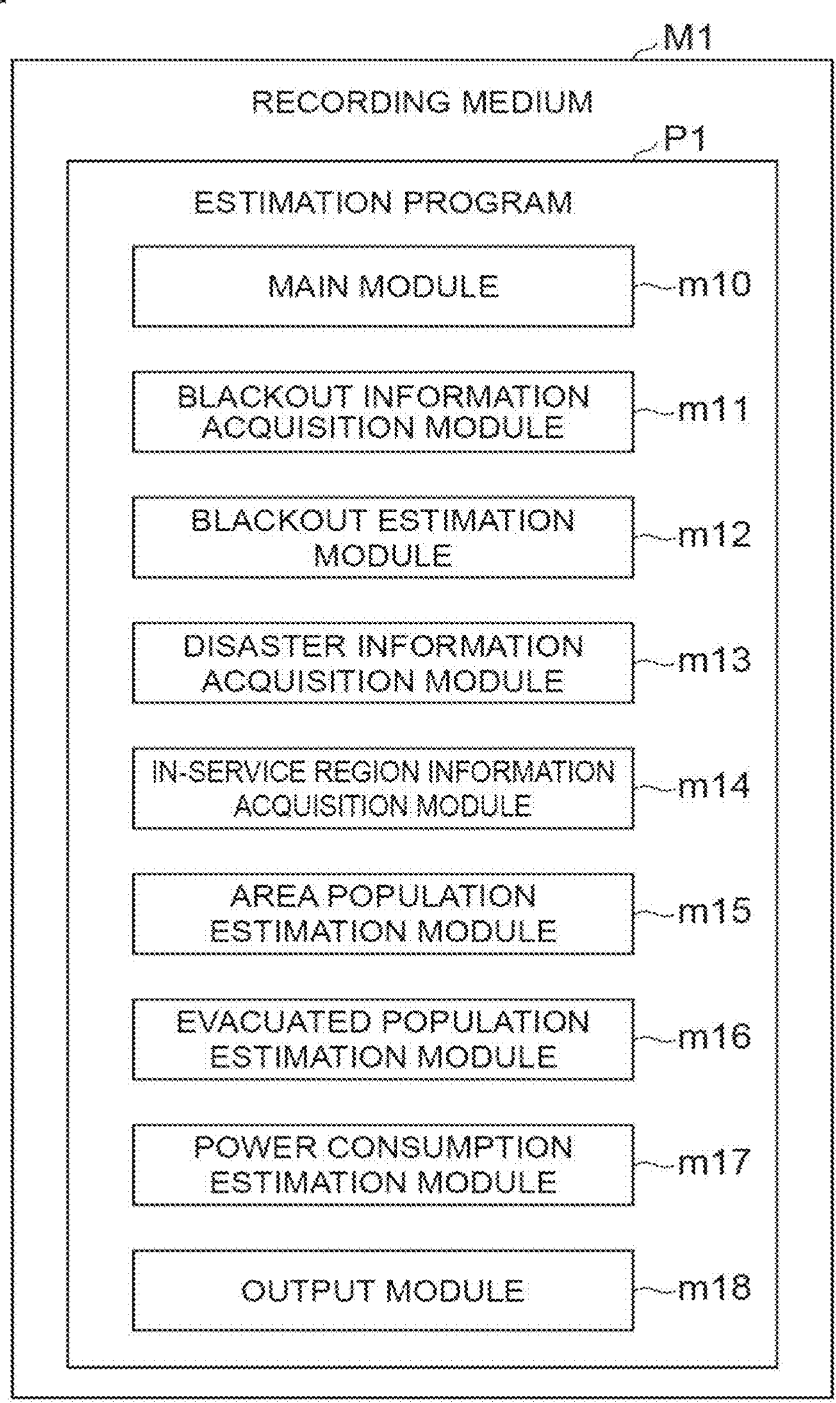
FIG. 12 is a diagram illustrating a configuration of an estimation program.

FIG. 12 is a diagram illustrating a configuration of an estimation program. An estimation program P1 includes a main module m10 that comprehensively controls estimation processing in the estimation apparatus 10, a blackout information acquisition module m11, a blackout estimation module m12, a disaster information acquisition module m13, an in-service region information acquisition module m14, an area population estimation module m15, an evacuated population estimation module m16, a power consumption estimation module m17, and an output module m18. Further, respective functions for the blackout information acquisition unit 11, the blackout estimator 12, the disaster information acquisition unit 13, the in-service region information acquisition unit 14, the area population estimator 15, the evacuated population estimator 16, the power consumption estimator 17, and the output unit 18 are realized by the respective modules m11 to m18.

Note that the estimation program P1 may be transmitted via a transmission medium such as a communication line, or may be stored in a recording medium M1 as illustrated in FIG. 12.

According to the estimation apparatus 10, the estimation method, and the estimation program P1 of this embodiment described above, the presence or absence of occurrence of a blackout in each area is recognized based on the blackout information in the wireless communication base station. Further, since the area population of the area where the blackout has occurred can be estimated based on the in-service region information in each area, the evacuated population of each evacuation center can be estimated based on the correspondence between the area and the evacuation center. Since the number of pieces of used equipment at the evacuation center depends on the evacuated population, a power consumption tendency at each evacuation center can be detected by estimating the number of pieces of used equipment of the power-using equipment based on the estimated evacuated population. Therefore, power can be supplied to the storage battery of the evacuation center in a timely manner.

Further, in an estimation apparatus according to another aspect, a blackout estimator may acquire location information of a wireless communication base station where a blackout has occurred as blackout occurrence location information indicating a location where a blackout has occurred, and compute a blackout probability, which is a probability that a blackout has occurred in each area, based on location relationship between a location indicated by the blackout occurrence location information and each area, thereby estimating area blackout information.

According to the aspect, a blackout probability of each area can be computed based on the location relationship between the location indicated by the blackout occurrence location information and each area considering that there is a high possibility that blackout has occurred in an area around a location of a wireless communication base station where a blackout has occurred. Therefore, by setting the blackout probability as area blackout information, it is possible to obtain area blackout information suitable for computing the evacuated population.

Further, in an estimation apparatus according to another aspect, a wiring class indicating the power supply route system is associated with the wireless communication base station and each area, and a blackout estimator may estimate the area blackout information by computing the blackout probability, which is the probability that a blackout has occurred in each area, set a blackout probability in an area having the same wiring class as that of a wireless communication base station indicated by the blackout information that a blackout has occurred to 100%, and set a blackout probability of an area having the same wiring class as that of the wireless communication base station indicated that a blackout has not occurred to 0%.

According to the aspect, since the blackout probability of each area is estimated based on whether each area has the same wiring class as that of the wireless communication base station where the blackout has occurred, area blackout information can be easily obtained.

Further, in an estimation apparatus according to another aspect, the blackout estimator may limit at least one of a wireless communication base station and an area related to estimation of area blackout information based on the disaster occurrence area indicated by the disaster information, which includes at least information on the disaster occurrence area indicating the geographical range in which the disaster has occurred.

According to the aspect, since at least one of a wireless communication base station and an area targeted for estimation of the area blackout information is limited based on information on the disaster occurrence area indicated by the disaster information, a processing load related to computing the area blackout information can be reduced.

Further, in an estimation apparatus according to another aspect, the evacuated population estimator may multiply the blackout probability in each area by the area population to compute an area evacuated population indicating a population considered to be evacuated to the evacuation center in each area, and estimate the evacuated population of each evacuation center by totaling area evacuated populations of areas each having a correspondence with each evacuation center.

According to the aspect, the evacuated population of each area is computed based on the blackout probability and the area population of each area, and the evacuated population of the evacuation center is computed by totaling the evacuated populations of the areas each having a correspondence with the evacuation center. In this way, a highly accurate evacuated population is obtained.

Further, in an estimation apparatus according to another aspect, the evacuated population estimator computes the area evacuated population by multiplying the weighting coefficient by the product of the blackout probability in each area and the area population, the weighting coefficient is generated by inputting the area feature quantity including at least the number of people in the service region indicating the number of mobile wireless communication terminals in the service region in each area to the weighting coefficient generation model, and the weighting coefficient generation model takes, as input, an area feature quantity including at least the number of people in the service region indicating the number of mobile wireless communication terminals in the service region in each area, outputs a weighting coefficient, and may be constructed by machine learning using training data including a theoretical weighting coefficient value, which is a weighting coefficient computed based on the actual area evacuated population, which is a population evacuated in each area at the past disaster occurrence time, the blackout probability, and area population, and the area feature quantity including at least the number of people in the service region.

According to the aspect, the area evacuated population can be computed by multiplying the product of the blackout probability and the area population by the weighting coefficient generated by the weighting coefficient generation model that reflects results of the area feature quantity, the area evacuated population, etc. Therefore, a highly accurate area evacuated population can be obtained.

Further, in an estimation apparatus according to another aspect, the power consumption estimator computes the number of pieces of used equipment by multiplying the number of pieces of power-using equipment provided in the evacuation center by a ratio of the evacuated population to the capacity of each evacuation center.

According to the aspect, the number of pieces of used equipment is computed by multiplying the number of pieces of power-using equipment provided in the evacuation center by the ratio of the evacuated population to the capacity of the evacuation center considering that the number of pieces of used equipment of the power-using equipment, such as heating appliances, is proportional to the number of people using the same. In this way, the number of pieces of used equipment can be accurately estimated.

Further, in an estimation apparatus according to another aspect, when the temperature at the evacuation center is greater than or equal to a preset threshold for a predetermined type of power-using equipment, the power consumption estimator may set an estimated value of the number of pieces of used equipment of the predetermined type of power-using equipment to zero.

According to the aspect, the estimated value of the number of pieces of used equipment is set to zero when the temperature is greater than or equal to a given threshold considering that there is a high possibility that power-using equipment such as heating appliances is not used when the temperature is high. Therefore, it becomes possible to estimate the appropriate number of pieces of used equipment depending on the temperature.

Further, in an estimation apparatus according to another aspect, the output unit may output remaining power information indicating the remaining power of each storage battery based on the remaining power of each storage battery acquired from the storage battery provided in each evacuation center and the power consumption in each evacuation center estimated by the power consumption estimator.

According to the aspect, since it is possible to recognize a decreasing trend in the remaining power of the storage battery in the evacuation center, it becomes possible to supply power to the storage battery in a timely manner.

Further, in an estimation apparatus according to another aspect, the blackout estimator may re-estimate the area blackout information when the blackout information changes, the evacuated population estimator may re-estimate the evacuated population based on the re-estimated area blackout information, the power consumption estimator may re-estimate the number of pieces of used equipment and the power consumption based on the re-estimated evacuated population, and the output unit may output power consumption information indicating the re-estimated power consumption.

According to the aspect, a series of processes for generating power consumption information is executed in response to the change in the blackout information. Therefore, it becomes possible to obtain latest power consumption information.

Even though this embodiment has been described in detail above, it is clear for those skilled in the art that this embodiment is not limited to the embodiment described in this specification. This embodiment can be implemented as modifications and changes without departing from the spirit and scope of the invention as defined by the claims. Therefore, the description in this specification is for the purpose of illustrative description and does not have any restrictive meaning with respect to this embodiment.

Each aspect/embodiment described in this specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, Utilizes UMB (Ultra Mobile Broadband), IEEE 802.11 (Wi-Fi), IEEE 802.16 (WiMAX), IEEE 802.20, UWB (Ultra-Wide-Band), Bluetooth (registered trademark), and other appropriate systems, and/or a next-generation system expanded based thereon.

The order of processing procedures, sequences, flowcharts, etc. of each aspect/embodiment described in this specification may be changed as long as there is no contradiction. For example, with regard to the method described in this specification, elements of various steps are presented in an illustrative order, and the method is not limited to the presented specific order.

Input/output information, etc. may be stored in a specific location (for example, a memory) or may be managed in a management table. The input/output information, etc. can be overwritten, updated, or additionally written. The output information, etc. may be deleted. The input information, etc. may be transmitted to another apparatus.

Judging may be performed using a value expressed by 1 bit (0 or 1), may be performed using a truth value (Boolean: true or false), or may be performed using numerical comparison (for example, comparison with a predetermined value).

Each aspect/embodiment described in this specification may be used alone, may be used in combination, or may be switched and used in accordance with execution. In addition, notification of predetermined information (for example, notification of "being X") is not limited to being explicitly performed, but may also be implicitly performed (for example, notification of the predetermined information is not performed).

Even though the disclosure has been described in detail above, it is clear to those skilled in the art that the disclosure is not limited to the embodiment described in the disclosure. The disclosure can be implemented as modifications and changes without departing from the spirit and scope of the disclosure as defined by the claims. Therefore, the description of the disclosure is for the purpose of illustrative description and does not have any restrictive meaning with respect to the disclosure.

Software should be broadly interpreted to mean an instruction, an instruction set, code, a code segment, program code, a program, a subprogram, a software module, an application, a software application, a software package, a routine, a subroutine, an object, an executable file, an execution thread, a procedure, a function, etc. regardless of being referred to as software, firmware, middleware, microcode, or hardware description language or referred to as another name.

In addition, software, an instruction, etc. may be transmitted and received via a transmission medium. For example, when software is transmitted from a website, a server, or another remote source using wired technology such as a coaxial cable, an optical fiber cable, a twisted pair, and a digital subscriber line (DSL) and/or wireless technology such as infrared, radio, and microwave, these wired and/or wireless technologies are included within definition of the transmission medium.

The information, the signal, etc. described in the disclosure may be represented using any of a variety of different technologies. For example, data, instructions, commands, information, signals, bits, symbols, chips, etc., which may be mentioned throughout the above description, may be represented by voltages, currents, electromagnetic waves, magnetic fields or magnetic particles, light fields or photons, or any combination thereof.

Note that terms described in the disclosure and/or terms necessary for understanding this specification may be replaced with terms having the same or similar meanings.

As used in this specification, the terms "system" and "network" are interchangeably used.

Further, the information, parameters, etc. described in this specification may be expressed as absolute values, may be expressed as relative values from a predetermined value, or may be expressed as other corresponding information.

As used in the disclosure, the terms "determining" and "determining" may encompass a wide variety of operations. For example, "determining" and "determining" can include considering to "determine" and "determine" judging, calculating, computing, processing, deriving, investigating, looking up, searching, inquiring (for example, looking up, searching, or inquiring in a table, a database, or another data structure), and ascertaining. In addition, "determining" and "determining" can include considering to "determine" and "determine" receiving (for example, receiving information), transmitting (for example, transmitting information), input, output, and accessing (for example, accessing data in a memory). In addition, "determining" and "determining" can include considering to "determine" and "determine" resolving, selecting, choosing, establishing, comparing, etc. That is, "determining" and "determining" can include considering to "determine" and "determine" any operation. In addition, "determining" may be replaced with "assuming", "expecting", "considering", etc.

As used in the disclosure, the phrase "based on" does not mean "based only on" unless expressly stated otherwise. In other words, the phrase "based on" means both "based only on" and "based at least on".

When terms "first", "second", etc. are used in this specification, any reference to elements thereof does not generally limit the quantity or order of these elements. These terms can be used in this specification as a convenient way of distinguishing between two or more elements. Thus, reference to first and second elements does not imply that only two elements can be employed therein or that the first element should precede the second element in any form.

As long as terms "include" and "including" and variations thereof are used in this specification or in the claims, these terms are intended to be inclusive as a term "comprising". Furthermore, a term "or" used in this specification or in the claims is not intended to be exclusive OR.

In this specification, it is assumed that a plurality of apparatuses is included unless it is clear from the content or technically that only one apparatus is present.

Throughout the disclosure, the plural is intended to be included unless the context clearly dictates otherwise.

REFERENCE SIGNS LIST

1: system, 10: estimation apparatus, 11: blackout information acquisition unit, 12: blackout estimator, 13: disaster information acquisition unit, 14: in-service region information acquisition unit, 15: area population estimator, 16: evacuated population estimator, 17: power consumption estimator, 18: output unit, 20: evacuation center information storage, M1: recording medium, m10: main module, m11: blackout information acquisition module, m12: blackout estimation module, m13: disaster information acquisition module, m14: in-service region information acquisition module, m15: area population estimation module, m16: evacuated population estimation module, m17: power consumption estimation module, m18: output module, N: network, P1: estimation program, ST: wireless communication base station group, sta, stb: wireless communication base station, SV: external information server.

The invention claimed is:

1. An estimation apparatus for estimating power consumption in an evacuation center, the estimation apparatus comprising:

a blackout estimator configured to estimate area blackout information indicating presence or absence of occurrence of a blackout in each given geographically divided area based on blackout information indicating presence or absence of occurrence of a blackout in a wireless communication base station;

an area population estimator configured to estimate an area population, which is a population of each area, based on in-service region information indicating a number of mobile wireless communication terminals in a service region in each area;

an evacuated population estimator configured to estimate an evacuated population, which is a population evacuated to each evacuation center, based on a correspondence between the evacuation center and each area, the area population of each area, and the area blackout information;

a power consumption estimator configured to estimate a number of pieces of used equipment, which is a number of pieces of power-using equipment using power in the evacuation center, based on the evacuated population for each type of power-using equipment, and multiply the number of pieces of used equipment by power consumption in the power-using equipment, thereby estimating power consumption in the evacuation center; and an output unit configured to output power consumption information indicating power consumption of each evacuation center.

2. The estimation apparatus according to claim 1, wherein the blackout estimator acquires location information of the wireless communication base station where a blackout occurs as blackout occurrence location information indicating a location where a blackout occurs, and computes a blackout probability, which is a probability that a blackout has occurred in each area, based on a location relationship between a location indicated by the blackout occurrence location information and each area, thereby estimating the area blackout information.

3. The estimation apparatus according to claim 2, wherein the blackout estimator limits at least one of the wireless communication base station and an area related to estimation of the area blackout information based on a disaster occurrence area indicated by disaster information, which includes at least information on the disaster occurrence area indicating a geographical range in which a disaster has occurred.

4. The estimation apparatus according to claim 2, wherein the evacuated population estimator multiplies the blackout probability in each area by the area population to compute an area evacuated population indicating a population considered to be evacuated to the evacuation center in each area, and estimates the evacuated population of each evacuation center by totaling area evacuated populations of areas each having a correspondence with each evacuation center.

5. The estimation apparatus according to claim 4, wherein:

the evacuated population estimator computes the area evacuated population by multiplying a weighting coefficient by a product of the blackout probability in each area and the area population, the weighting coefficient is generated by inputting an area feature quantity including at least a number of people in the service region indicating a number of mobile wireless communication terminals in the service region in each area to a weighting coefficient generation model, and the weighting coefficient generation model is configured to:

take, as input, an area feature quantity including at least a number of people in the service region indicating a number of mobile wireless communication terminals in the service region in each area and output the weighting coefficient, and be constructed by machine learning using training data including a theoretical weighting coefficient value, which is a weighting coefficient computed based on an actual area evacuated population, which is a population evacuated in each area at a past disaster occurrence time, the blackout probability, and the area population, and the area feature quantity including at least the number of people in the service region.

6. The estimation apparatus according to claim 1, wherein:

a wiring class indicating a power supply route system is associated with the wireless communication base station and each area, and the blackout estimator estimates the area blackout information by computing a blackout probability, which is a probability that a blackout has occurred in each area, sets the blackout probability in an area having the same wiring class as a wiring class of a wireless communication base station indicated by blackout information that a blackout has occurred to 100%, and sets the blackout probability in an area having the same wiring class as a wiring class of the wireless communication base station indicated that a blackout has not occurred to 0%.

7. The estimation apparatus according to claim 6, wherein the blackout estimator limits at least one of the wireless communication base station and an area related to estimation of the area blackout information based on a disaster occurrence area indicated by disaster information, which includes at least information on the disaster occurrence area indicating a geographical range in which a disaster has occurred.

8. The estimation apparatus according to claim 1, wherein the power consumption estimator computes the number of pieces of used equipment by multiplying a number of pieces of power-using equipment provided in the evacuation center by a ratio of the evacuated population to a capacity of each evacuation center.

9. The estimation apparatus according to claim 1, wherein, when a temperature at the evacuation center is greater than or equal to a preset threshold for a predetermined type of power-using equipment, the power consumption estimator sets an estimated value of the number of pieces of used equipment of the predetermined type of power-using equipment to zero.

10. The estimation apparatus according to claim 1, further comprising a storage battery provided in each evacuation center and wherein the output unit outputs remaining power information indicating remaining power of each storage battery based on remaining power of each storage battery acquired from the storage battery provided in each evacuation center and power consumption in each evacuation center estimated by the power consumption estimator.

11. The estimation apparatus according to claim 1, wherein:

the blackout estimator re-estimates the area blackout information when the blackout information changes, the evacuated population estimator re-estimates the evacuated population based on the re-estimated area blackout information, the power consumption estimator re-estimates the number of pieces of used equipment and the power consumption based on the re-estimated evacuated population, and the output unit outputs the power consumption information indicating the re-estimated power consumption.

* * * * *